US010182325B2

(12) United States Patent
Dobaj

(10) Patent No.: US 10,182,325 B2
(45) Date of Patent: Jan. 15, 2019

(54) MOVEMENT CONTROL SYSTEM

(71) Applicant: Anthony Peter Dobaj, Highlands Ranch, CO (US)

(72) Inventor: Anthony Peter Dobaj, Highlands Ranch, CO (US)

(*) Notice: Subject to any disclaimer, the term of this patent is extended or adjusted under 35 U.S.C. 154(b) by 42 days.

(21) Appl. No.: 15/359,625

(22) Filed: Nov. 23, 2016

(65) Prior Publication Data
US 2017/0147279 A1 May 25, 2017

Related U.S. Application Data

(60) Provisional application No. 62/258,961, filed on Nov. 23, 2015.

(51) Int. Cl.
| | |
|---|---|
| *G06F 3/0346* | (2013.01) |
| *H04W 4/80* | (2018.01) |
| *G05B 19/409* | (2006.01) |
| *G06F 3/01* | (2006.01) |
| *G06F 3/038* | (2013.01) |

(52) U.S. Cl.
CPC ............ *H04W 4/80* (2018.02); *G05B 19/409* (2013.01); *G06F 3/014* (2013.01); *G06F 3/017* (2013.01); *G06F 3/0346* (2013.01); *G06F 3/0383* (2013.01); *G06F 2203/0384* (2013.01)

(58) Field of Classification Search
CPC ................ G05B 19/042; G05B 19/409; G05B 2219/23249; G06F 3/162; G06F 3/017; G06F 3/0346; G06F 3/014; G06F 3/0383; G06F 2203/0384; H04W 4/008; H04W 4/80

USPC .......................................................... 700/94
See application file for complete search history.

(56) References Cited

U.S. PATENT DOCUMENTS

| | | | | |
|---|---|---|---|---|
| 5,662,523 A | * | 9/1997 | Yasumaru ............... | A63F 13/12 273/DIG. 17 |
| 5,796,354 A | * | 8/1998 | Cartabiano ............. | G06F 3/014 273/148 B |
| 7,523,012 B2 | | 4/2009 | Shah et al. | |
| 8,405,612 B2 | * | 3/2013 | Kruse ..................... | G06F 3/014 345/163 |
| 8,421,448 B1 | * | 4/2013 | Tran ....................... | G01R 33/07 324/207.2 |
| 8,933,876 B2 | * | 1/2015 | Galor ..................... | G06F 3/005 345/156 |
| 9,432,113 B2 | | 8/2016 | Oi et al. | |

(Continued)

FOREIGN PATENT DOCUMENTS

GB          WO9723060 A1     6/1997

*Primary Examiner* — Hemant S Patel
(74) *Attorney, Agent, or Firm* — Roger A. Jackson

(57) ABSTRACT

An movement control system and method of use is disclosed wherein, the present invention is a movement control system for converting movement by an object into a change of state for an article, the movement electrical control system including sensing circuitry that is operative upon activation to wirelessly pickup a near field movement by the object and subsequently generate a sensor signal. Further included in the movement control system is control circuitry that is operative to monitor the sensor signal and to produce an event marker signal upon receipt of the sensor signal, the event market signal is in electrical communication with an article that effectuates a change of state based upon said event marker signal.

16 Claims, 8 Drawing Sheets

(56) References Cited

U.S. PATENT DOCUMENTS

| | | | |
|---|---|---|---|
| 9,582,076 B2* | 2/2017 | Kienzle | G06F 3/014 |
| 9,652,038 B2* | 5/2017 | Osman | G06F 3/014 |
| 9,696,802 B2* | 7/2017 | Priyantha | H04B 5/0037 |
| 9,857,879 B2* | 1/2018 | Kursula | G06F 3/017 |
| 2002/0033803 A1* | 3/2002 | Holzrichter | G06F 3/012 |
| | | | 345/158 |
| 2002/0065121 A1* | 5/2002 | Fukunaga | A63F 13/08 |
| | | | 463/8 |
| 2011/0007035 A1 | 1/2011 | Shai | |
| 2015/0130698 A1* | 5/2015 | Burgess | G06F 1/163 |
| | | | 345/156 |
| 2015/0140934 A1 | 5/2015 | Abdurrahman et al. | |
| 2015/0277569 A1* | 10/2015 | Sprenger | G06F 3/017 |
| | | | 345/156 |
| 2015/0346820 A1* | 12/2015 | Poupyrev | G06F 3/014 |
| | | | 345/156 |
| 2016/0320847 A1* | 11/2016 | Coleman | G06F 3/04842 |
| 2017/0205880 A1* | 7/2017 | Osman | G06F 3/014 |

* cited by examiner

| FIFO1 | | FIFO2 | | FIFO3 | |
|---|---|---|---|---|---|
| Addr | Value | Addr | Value | Addr | Value |
| 0x000C0000 | 0 | 0x000C0800 | 0 | 0x000C1000 | 0 |
| 0x000C0001 | 1 | 0x000C0801 | 0 | 0x000C1001 | 0 |
| 0x000C0002 | 1 | 0x000C0802 | 0 | 0x000C1002 | 0 |
| 0x000C0003 | 1 | 0x000C0803 | 1 | 0x000C1003 | 0 |
| 0x000C0004 | 1 | 0x000C0804 | 1 | 0x000C1004 | 0 |
| 0x000C0005 | 0 | 0x000C0805 | 1 | 0x000C1005 | 0 |
| 0x000C0006 | 0 | 0x000C0806 | 1 | 0x000C1006 | 1 |
| 0x000C0007 | 0 | 0x000C0807 | 0 | 0x000C1007 | 1 |
| 0x000C0008 | 0 | 0x000C0808 | 0 | 0x000C1008 | 1 |
| 0x000C0009 | 0 | 0x000C0809 | 0 | 0x000C1009 | 1 |
| 0x000C000A | 0 | 0x000C080A | 0 | 0x000C100A | 0 |

Fig. 6

MOVEMENT CONTROL SYSTEM

RELATED PATENT APPLICATION

This application claims the benefit of U.S. provisional patent application Ser. No. 62/258,961 filed on Nov. 23, 2015 by Anthony Peter Dobaj of Highlands Ranch, Col., U.S.

TECHNICAL FIELD

The present invention relates generally to a system for controlling electrical signals. More specifically, the present invention relates to the field of wireless selected movement having a first object with a user manual first specific free space movement(s) that is detected substantially near field by a first transceiver having a protocol to generate a coordinated a first signal, wherein the transceiver is in electrical communication with a media delivery/communication device for the user, wherein ultimately the first free space movement results in a desired change of state for the media delivery/communication device that is in accordance with the first signal.

BACKGROUND OF INVENTION

Human/machine interfacing is a constantly evolving field, given the physical limitations of humans as controlled by our senses or taste, touch, smell, sight, hearing, temperature, balance, vibration, kinetic movement, and sound, with the accompanying restraints on each of these senses-such as visual acuity for focus and distance, range of temperature sensing ability, frequency and amplitude limits on hearing, bounded range of olfactory detection, touch range limit of lower end detectability to higher threshold of pain, taste limits, strength and speed of human limb movements, and so on.

Thus the human machine interface must operate within these senses and their related limits, wherein this science is termed "User Interface" (UI). The UI can be broken down into evolutionary categories such as Batch Interface—this was an early computer interface that was for the convenience of the computer and not the human—wherein a group of batch of data (i.e. punch cards or punched tape) were created and organized for a batch input to the computer resulting in no live interaction as between the human and computer at all, with events happening in a longer term series timeline, i.e. batch in, computer processing, and batch output, i.e. turn in your punched cards and come back tomorrow for your output being common.

Subsequent to this, UI evolved into a command line interface which is where a human would input specialized line text which had the big advantage of more of a "real time" human/machine interface, than the batch system, however, a significant drawback was the memory burden on the human for the specialized text that they had to know, thus failing the intuitive and easy to learn goals as desired features of UI. Examples of command line interface were teletype machines and early computer video display terminals.

The next evolution of UI was a text based user interface or otherwise known as "drop down menus" that allowed for more of a standardized group of computer commands and greatly reduced the undesirable issues of memory burden that the command line interface had, thus resulting in quicker and easier learning of computer commands by the human.

Continuing, UI has morphed into the "graphical user interface" which brought in the mouse, multiple windows, pointers, and the like, thus the graphical user interface separated the series text command input into single point and click command based on a graphical icon, which further increased the intuitive human learning curve plus eliminated language barriers as a graphic icon is universally understood worldwide irrelevant to the human user's language. As an example instead of typing the command to "print" or even finding the drop down menu that contained the "print" command, all a human user had to do was point and click to the printer graphical icon, thus resulting in an even faster and easier to use UI for the computer.

Fast forwarding to modern times, the UI has another challenge in the move toward mobile computing, as the aforementioned ability to type in text, use drop down menus, and point and click with a mouse are substantially eliminated, as the human in having a portable and mobile device does not easily have the traditional UI human input devices such as a mouse or keyboard leaving other human sense UI input capabilities of or taste, touch, smell, sight, hearing, temperature, balance, vibration, kinetic movement, and sound, that have to be utilized in new and different ways than before for specific desired commands to the mobile computer.

Eliminating the mouse and keyboard has led to the touch screen interface, both in the tactile and haptic type, wherein the haptic type has seemed to become the most popular as haptic means creating the sense of touch (that would have been via a keyboard button depression in the past), through other means such as vibration, forces, motions, or even visual feedback to the human user, this is as opposed to tactile touch screens that utilized a "soft" screen for the user to sense a slight depression movement when touching the screen for touch screen feedback, however, with the currently popular "hard" touch screen, i.e. there is no touch screen depression based on touch, haptic feedback is the norm.

The popularity of the hard touch screen is based on its ability to more quickly and accurately respond to touch screen commands, plus the ability to have smaller icons to touch screen on allowing for a wider diversity of commands allowed for a given touch screen size as compared to tactile touch screens that require larger screen icons and work slower for fast paced multiple screen touch commands.

Tactile touch screens typically use a resistive system that actuates via physical depression (the advantage being anything (any material) can make the force depression). The hard touch screen typically works via a capacitive system (requiring an electrically conductive contact—that's why they don't work with gloves on your hand) that can sense capacitive charge change when touched or a surface acoustic wave system (that doesn't require a conductive contact) that senses wave disruption when touched. Voice recognition command has also played a part in UI without again the mouse and keyboard, however, having limitations in working in noisy environments plus the inability to work in quiet environments wherein the human user cannot speak freely, plus additional limitations in the accuracy of voice to desired command output.

In looking at a specific class of mobile devices such as in sports applications wherein the human user is being active and typically has on special attire (such as gloves for skiing), the ability for the human user to utilize a touch screen in not possible for several reasons, being that gloves prevent any sort of accurate useful touch screen activity and under the concept of "least astonishment" the human user in a sports activity cannot hardly pay any attention to their commands other than a very momentary action—and certainly not having the ability to focus and look at a screen for information or feedback, also display screens are of little use in bright sunlight outdoor environments. Thus in sports device applications the UI needs to focus upon selected movement commands that do not require any contact, i.e. selected movements that require minimal attention to achieve the desired outputs from the mobile device.

In general desirable qualities in a UI system include;
a. Clarity—simple and straightforward
b. Distinction—logical separation of different commands
c. Intuitive—easy to learn and remember
d. Responsiveness—fast and definite command outputs
e. Consistency—a selected command results in a specific desired output
f. Reliability—low maintenance and low failures Plus for a sport mobile device added desirable qualities of;
1. Lightweight, small, tough, and bullet proof (able to withstand abuse dropping, bumping around, and so on).
2. Weather and waterproof.
3. Aesthetically pleasing as the components are worn by the user In looking at the prior art in the near field area for wireless communication in WIPO publication 97/23060 to White et al., disclosed is an apparatus for bidirectional data and unidirectional power transmission between master and slave units using inductive coupling. In White, there is a base unit being the master that is used with a number of pieces for the slave unit that sits on top of the base unit wherein this particular application is for toys, thus with a consistent base unit various cartoon characters could be placed upon the base unit, with the cartoon character could have physical actions or voice output wirelessly transmitted from the base. In White, the means for data transmission are RF in addition to power being transmitted through induction from the base (active-master) to the cartoon character (passive-slave).

Continuing in the hand gesturing signal prior art in United States Patent Application Number 2016/0320847 to Coleman, et al., disclosed a method for modifying an audio parameter based on a gesture, the method comprising: acquiring sensor data associated with a hand of a user; analyzing the sensor data to determine at least one hand position; detecting a hand gesture based on the at least one hand position; in response to the hand gesture, modifying a spatial audio parameter associated with an audio stream to generate a modified audio stream; and causing the modified audio stream to be reproduced for output to the user. Thus Coleman is a gesture learning method only for far field wireless being at several feet of distance wherein Coleman does not teach hardware/software specifics on how the method is enabled.

Continuing in the near field wireless prior art in U.S. Pat. No. 7,523,012 to Shah, et al. disclosed is a method for controlling a mode of operation of a handheld electronic device, the method comprising the steps of: determining whether the handheld electronic device is docked in a holster, wherein the holster is movably coupled to a swivel that allows the holster to be rotated about an axis of the swivel. Shah then measuring a first magnetic field density using Hall sensors corresponding to an angular position of the swivel with respect to the holster when the handheld electronic device is docked in the holster; and generating a signal to change the mode of operation of the handheld electronic device due to the angular position of the swivel based on the measured first magnetic field density. Like Coleman, Shah is only a method and solely teaches a cursory content on hardware/software, Shah's principal application is for a mobile device holster that is limited to magnetic sensor activation.

Further in the optical sensing prior art in U.S. Pat. No. 9,432,113 to Matas disclosed a method comprising: by a computing device, receiving sensor data from a sensor on the computing device indicating physical movement of the computing device over a period of time; by the computing device, determining, based on the sensor data, two contemporaneous signals comprising: a motion-trigger signal corresponding to a first characteristic of the physical movement of the computing device; and a motion-confirm signal corresponding to a second characteristic of the physical movement of the computing device.

In Matas, in the computing device determining whether: the motion-trigger signal comprises a transition from within a pre-defined threshold band to outside of the pre-defined threshold band, wherein the pre-defined threshold band comprises a range of physical movement along the first characteristic and the second characteristic; and the motion-confirm signal is within the pre-defined threshold band; by the computing device, when the motion-trigger signal comprises the transition from within the pre-defined threshold band to outside of the pre-defined threshold band and the motion-confirm signal is within the pre-defined threshold band.

Thus Matas initiating a pre-defined action of the computing device, wherein the pre-defined action is associated with the first characteristic and not associated with the second characteristic; and by the computing device, when the motion-trigger signal comprises the transition from within the pre-defined threshold band to outside of the pre-defined threshold band and the motion-confirm signal is outside the pre-defined threshold band, preventing initiation of the pre-defined action. The novelty in Matas is in the dual switch system with optical intensity adjustment.

Next, in the close range wireless arts in United States Patent Application Number 2015/0140934 to Abdurrahman et al., discloses a system comprising: a body-wearable user device including a user device wireless transceiver configured to communicate directly with a secondary device wireless transceiver associated with a secondary device; a sensor configured to sense a physical motion of at least one of the user device and a body part of a user of the user device and output a signal based on the physical motion.

Further included in Abdurrahman is a processor that is communicatively coupled to the user device wireless transceiver and the sensor, configured, based on the output from the sensor, to: cause the user device wireless transceiver to transmit to the secondary device wireless transceiver a pair signal according to a first wireless modality; complete a wireless pairing between the user device wireless transceiver and the secondary device wireless transceiver according to a second wireless modality different than the first wireless modality. The device is typically wrist mounted in Abdurrahman and responds to hand and finger motions, see FIGS. 7A, 7B, 8A, 8B, 8C, 9A, 9B, 9C, 10A, 10B, 10C, and 11, and would not be considered to be near field in nature, it would seem that the generic hand gestures would result in unintended commands to the system.

Further, in the motion command prior art in United States Patent Application Number 2011/0007035 to Shai disclosed is a finger-worn user input device which includes a first stationary section adapted to fit on a human hand finger and comprising: a) a first rotatable section at least partially overlapping the first section and adapted to rotate and tilt relative to the first section; and b) an indication mechanism for relaying an indication corresponding to a relative position obtained between the first stationary section and the first rotatable section. In Shai, basically two finger rings are used to indicate relative position to one another, for energy harvesting, and other more general applications.

What is needed is a lightweight, compact, portable, and aesthetically pleasing UI system that accommodates the mobile sport device user that is designed to work outdoors in wet or dry weather, hot or cold weather, bright sunlight or night time darkness, and further accommodating user wearing gloves, coats, helmets, goggles, and the like, plus without the user having to pay no more attention to their command than a moment in time for their specific command to produce a desired mobile device output. The desired UI system would also be capable of multiple selected user commands that correlate to multiple desired mobile device outputs.

Sample applications would be for the mobile device of a MP3 music player wherein the desired outputs would include but not be limited to; volume up and down, music track forward or backward, mute on and off, channel, song, or playlist change, all while the mobile device is deeply buried within for instance a coat pocket-being safely protected from the outdoor elements. Further, sample UI user inputs would include but not be limited to hand swipes movement in the X, Y, and Z axes, i.e. laterally, vertically, and in/out, also circular movement (clockwise & counter clockwise), or even movement event sequences such as a lateral movement followed by a circular movement in close time succession.

Further desirably, UI system features would be such that a standard mobile device could be utilized that a user typically already possesses, wherein the major component of the present invention system would be a transceiver that can of course wirelessly sense the gloved hand movement of the user for instance and convert that specific user gloved hand movement into a specific electrical communication to the standard mobile device that will in turn result in the desired mobile device change of state, i.e., lowering volume.

SUMMARY OF INVENTION

Broadly, the present invention is a movement control system for converting movement by an object into a change of state for an article, the movement control system including sensing circuitry that is operative upon activation to wirelessly pickup a near field movement by the object and subsequently generate a sensor signal. Further included in the movement control system is control circuitry that is operative to monitor the sensor signal and to produce an event marker signal upon receipt of the sensor signal, the event market signal is in electrical communication with an article that effectuates a change of state based upon said event marker signal.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 6 shows a table of the first in first out values for the memory buffer;

TERM DEFINITIONS

Figure 1:
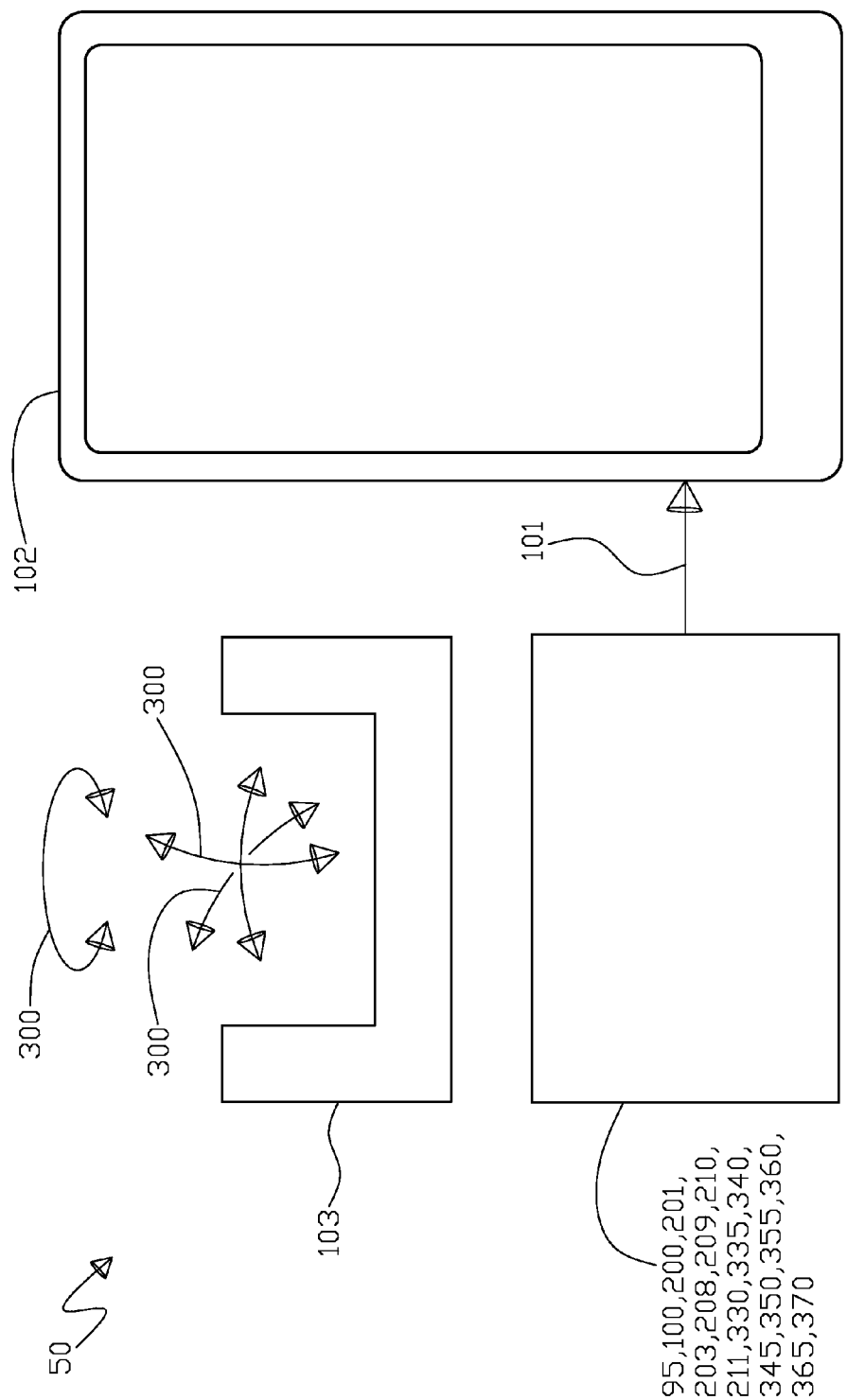
FIG. 1 shows a summary schematic block diagram of the movement control system that includes a permanent magnet, a hall effect sensor array, an electrical communication from the hall effect sensor array to a media delivery communication device.

FIFO—First In First Out data memory buffer
GPIO pins—General Purpose Input/Output pins for a chip
HESA—Hall Effect Sensor array
LED—Light Emitting Diode
LUT—Look Up Table
MDCD—Media Delivery Communication Device; Examples would be smart phones, MP3 players, Tablets, satellite phones, and the like.
NEAR FIELD COMMUNICATION—Communication protocol that enables multiple electrical devices to wirelessly communicate with one another that are in close physical proximity to each other, typically within about 2 inches. The medium used can include but not limited to magnetic, radar, radio frequency, blue tooth, laser, infrared, ultrasonic, optical, capacitance, and resistance, as examples.
PCBA—Printed Circuit Board Assemblies
RF—Radio Frequency
SOC—System on Chip
UI—User Interface being the design field of human—machine interaction, having an overall goal of efficiency (maximum output with minimal input), effective (getting desired machine results reliably with minimal error), and ease of use for the human (intuitive, easy to learn, easy to remember, and the like).

REFERENCE NUMBERS IN DRAWINGS

50 Movement Control System
95 Hall Effect Sensor
100 Hall Effect Sensor 95 Array 101 Electrical Communication or event marker signal from the Hall Effect Sensor Array 100 and the control circuitry 201 to the Media Delivery Communication Device 102
102 Portable Media Delivery Communication Device that can be in the form of a smart phone, MP3 player, and the like.
103 Permanent magnet
120 Power generation & management (energy harvesting transducer)
121 Radio frequency circuitry module
122 Radio frequency circuitry antenna
124 Gyro sensor
125 Power button switch
127 System on chip
128 Power generation & management
129 Micro motor
130 LED indicator
150 Waveform A
151 Waveform B
152 Waveform C
153 Buffer memory
154 Vertical axis field strength
155 Horizontal time axis
160 Magnetic waveform D
161 Magnetic waveform F
162 Magnetic waveform G
195 Support circuitry for the plurality of Hall effect sensors 200
200 Plurality of Hall Effect Sensors 95
201 Control circuitry that inputs the plurality Hall Effect Sensors 95, 100, 200 output plus other sensor output for 335, 345, 355, 365 wherein the control circuitry 201 outputs commands to the media delivery communication device 202
202 Additional circuitry for control circuitry 201 for a plurality of Hall effect sensors 200
203 Electrical communication or sensor signal from plurality of Hall Effect Sensors 200 to control circuitry 201, or other sensors 335, 345, 355, 365
204 First sensor signal
205 Second sensor signal
206 First event marker signal
207 Second event marker signal
208 Additional circuitry for control circuitry 201 for the 3D magnetic sensor 335
209 Additional circuitry for control circuitry 201 for the radar chip 345
210 Additional circuitry for control circuitry 201 for the flex capacitor 355
211 Additional circuitry for control circuitry 201 for the ultrasonic transceiver 365
300 Movement of magnet 103 or the object 310
301 X axis movement 300 preferably in LUT swipe R-L or L-R
302 Y axis movement 300 preferably in LUT swipe T-B or B-T
303 Z axis movement 300 preferably in LUT swipe Tap
304 Clockwise movement 300
305 User
306 Counter clockwise movement 300
307 Hand of user 305
310 Object that in a preferred embodiment is a user's 305 glove 315 on their hand 307 that receives the magnet 103, however, object can be any object having movement 300
315 Glove of user 305
320 Change of state of the media delivery communication device 102, in the preferred embodiment can include but not limited to play commands of change of track, volume control up and down, playlist change, mute on and off, and the like, thus as an example a first change of state can be volume up and a second change of state can be volume down.
325 Article in the preferred embodiment is a mobile media delivery communication device 102
330 Sensing circuitry that includes but not limited to sensors 95, 100, 200, 335, 345, 355,
365
335 3D magnetic sensor
340 Support circuitry for the 3D magnetic sensor 335
345 Radar chip
350 Support circuitry for the radar chip 345
355 Flex capacitor
360 Support circuitry for the flex capacitor 355
365 Ultrasonic transceiver
370 Support circuitry for the ultrasonic transceiver 365

DETAILED DESCRIPTION

With initial reference to FIG. 1, shown is a summary schematic block diagram of the movement control system 50 that includes a permanent magnet 103, a hall effect sensor 95 array 100, an electrical communication 101 from the hall effect sensor array 10 and control circuitry 201 to a media delivery communication device 102. Noting that multiple movement 300 of the magnet 103 by the user 305 in different directions, such as X, Y, Z axes, and circular-clockwise and counter clock wise, in addition to the speed/sequence of the movements 300 (high/low & timing) could be programmed to effectuate multiple state changes or play commands for the media delivery communication device 102, see also FIG. 7.

Figure 2:
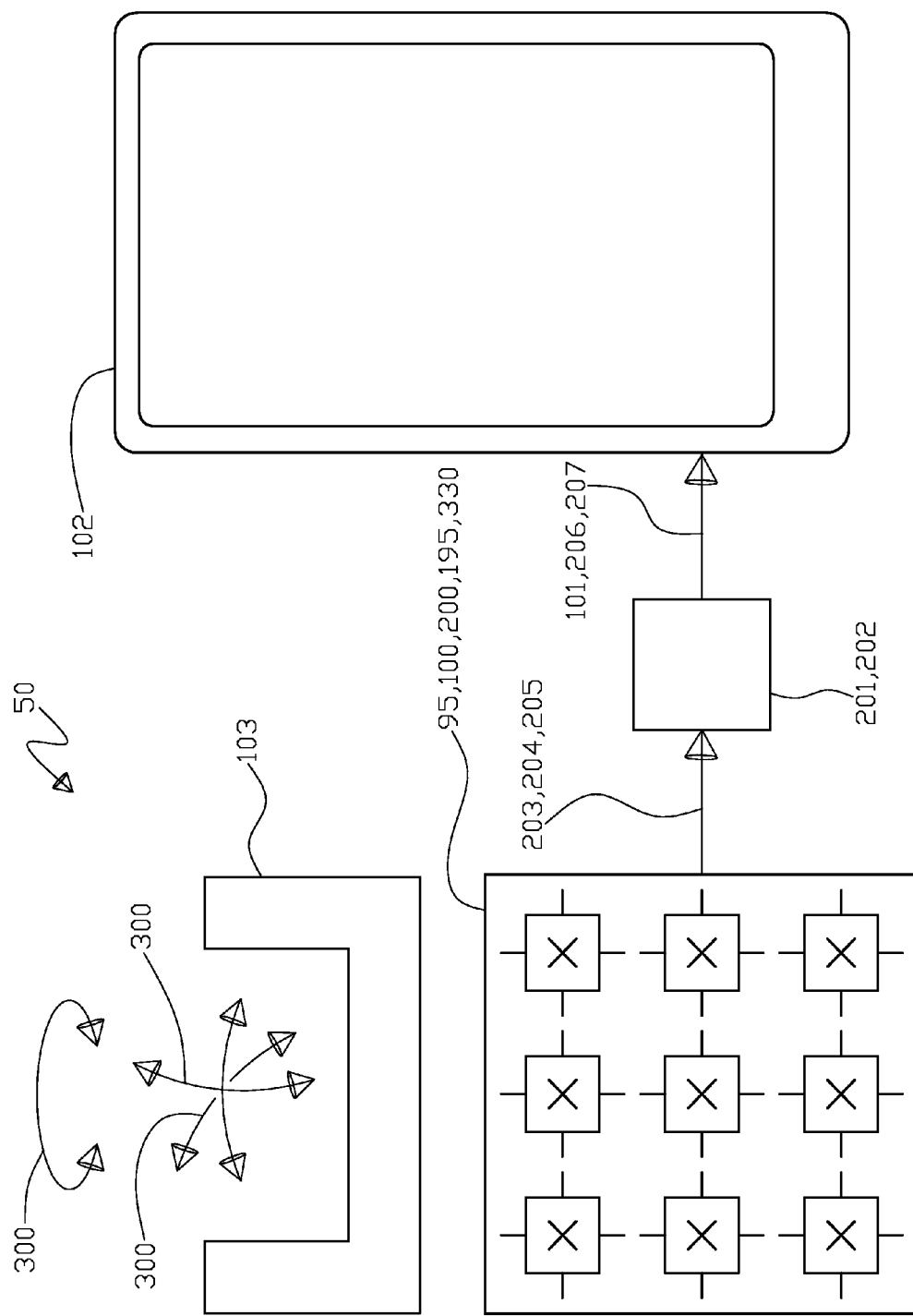
FIG. 2 shows a schematic block diagram of the movement control system that includes a permanent magnet, a hall effect sensor array, an electrical communication from the hall effect sensor array to control circuitry, and an electrical communication from the control circuitry to the media delivery communication device.

Continuing, FIG. 2 shows a schematic block diagram of the movement control system 50 that includes the permanent magnet 103, the hall effect sensor array 100, an electrical communication 203 from the hall effect sensor array 100 to control circuitry 201, the electrical communication 101 from the control circuitry 201 to the media delivery communication device 102. Noting that a plurality 200 of hall effect sensors 95 forming an array 100 are preferably arranged in a grid on a circuit board, wherein control circuitry 201 captures through electrical communication 203 each hall effect sensor 95 output 160, 161, 162 being the relative time, state, and position in the grid, initiated by movement 300 from the magnet 103 with subsequent decoding of the movement 300 in direction, speed, and dwell time.

Figure 3:
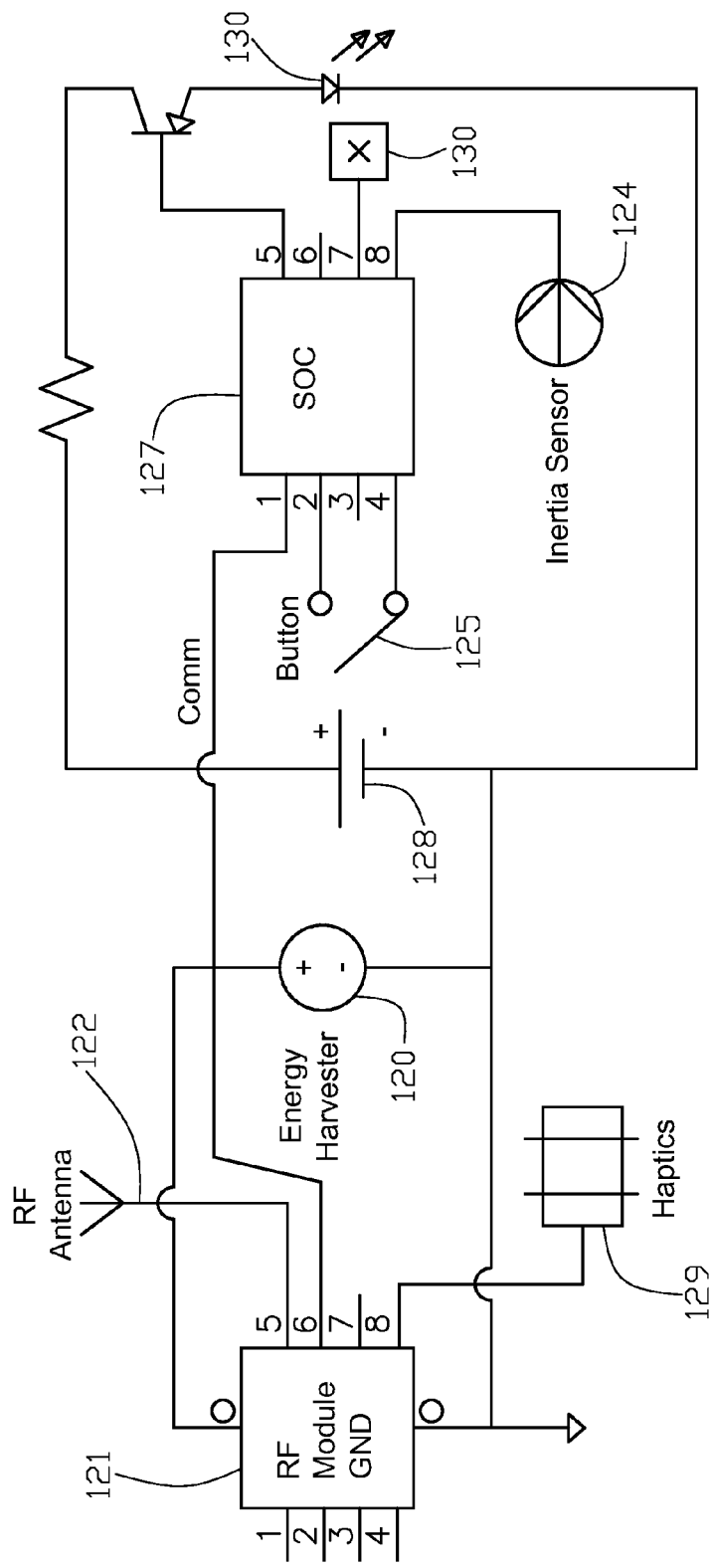
FIG. 3 shows a detailed schematic diagram of the movement control system being in particular the control circuitry that includes a radio frequency module, an antenna, a haptic vibration micro-motor, plus an energy harvester, a power management capacitor, a system on chip that includes a switch, a gyro sensor, and an LED indicator.

Moving onward, FIG. 3 shows a detailed schematic diagram of the movement control system 50 being in particular the control circuitry 201 that includes a radio frequency module 121, an antenna 122, a haptic vibration micro-motor 129, plus an energy harvester 120, a power management capacitor 128, a system on chip 127 that includes a switch 125, a gyro sensor 124, and an LED indicator 130. The chip 127 includes the typical elements of volatile and non-volatile memory, timing structures, registers, and the like.

Figure 4:
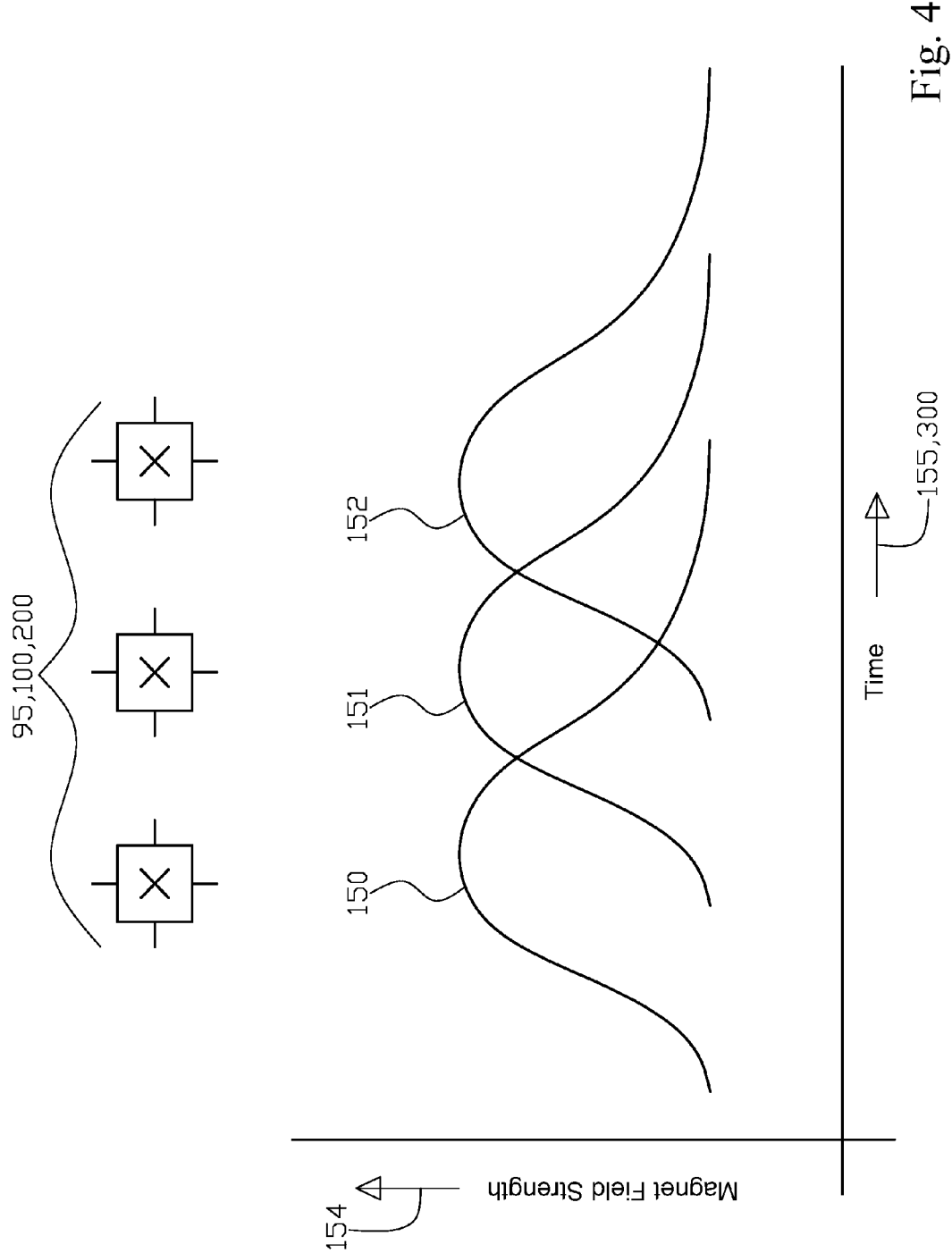
FIG. 4 shows a sequencing magnetic waveform from the permanent magnet as the magnet is swept or has movement across the hall effect sensors taking into account the movement versus time and a magnetic field strength.

Next, FIG. 4 shows a sequencing magnetic waveform 150, 151, 152 from the permanent magnet 103 as the magnet 103 is swept or has movement 300 across the hall effect sensors 95, 100, 200 taking into account the movement 300 versus time 155 and a magnetic field strength 154 as depicted by the waves 150, 151, 152. Thus the FIG. 4 wave forms 50, 151, 152 show each sensors 95 rise and fall of magnet field strength as magnet 103 movement 300 goes over each sensor 95, thus when the field strength 150, 151,

152 reaches a threshold level results in the sensor 95 output changing state as shown by waveforms 160, 161, 162, wherein these wave forms are captured by chip 127 by polling the General Purpose input/output pins (one pin per sensor 95), with sufficient frequency to not be under sampled, wherein these stored values are in the FIFO buffer memory 153 at one FIFO per sensor 95.

Collectively in FIG. 4 the state changes captured in the FIFO memory buffer 153 would be inputs to the discrimination algorithm, which would output commands to the media delivery communication device 102 via electrical communication 101 (preferably being wireless through Bluetooth), wherein the FIG. 6 table is represented for three sensors 95 being buffer combination 153 for a 2048 word FIFO. The actual size of the FIFO memory buffer 153 and polling frequency could vary depending upon the sensor 95 bias and magnet 103 type for the best accuracy.

Figure 5:
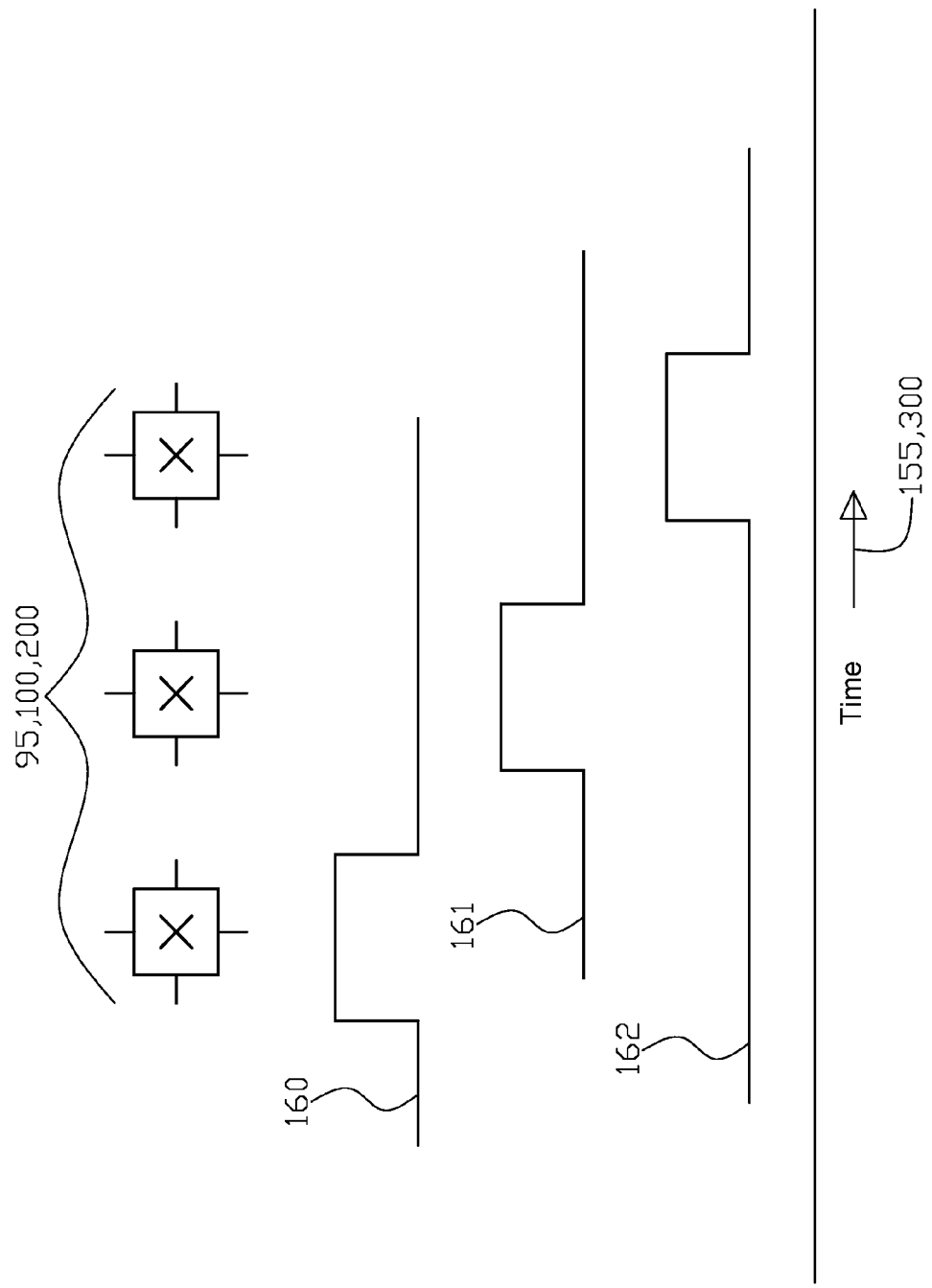
FIG. 5 shows a sequencing hall effect sensor output waveform from the hall effect sensor array from the magnet movement as shown in FIG. 4, with both FIGS. 4 and 5 having the same time X axis.

Further, FIG. 5 shows a sequencing hall effect sensor 95, 100, 200 output waveforms 160, 161, 162 from the hall effect sensor 95 array 100, 200 from the magnet 103 movement 300 as shown in FIG. 4, with both FIGS. 4 and 5 having the same time 155, X axis;

Yet further, FIG. 6 shows a table of the first in first out values for the buffer memory 153.

Figure 7:
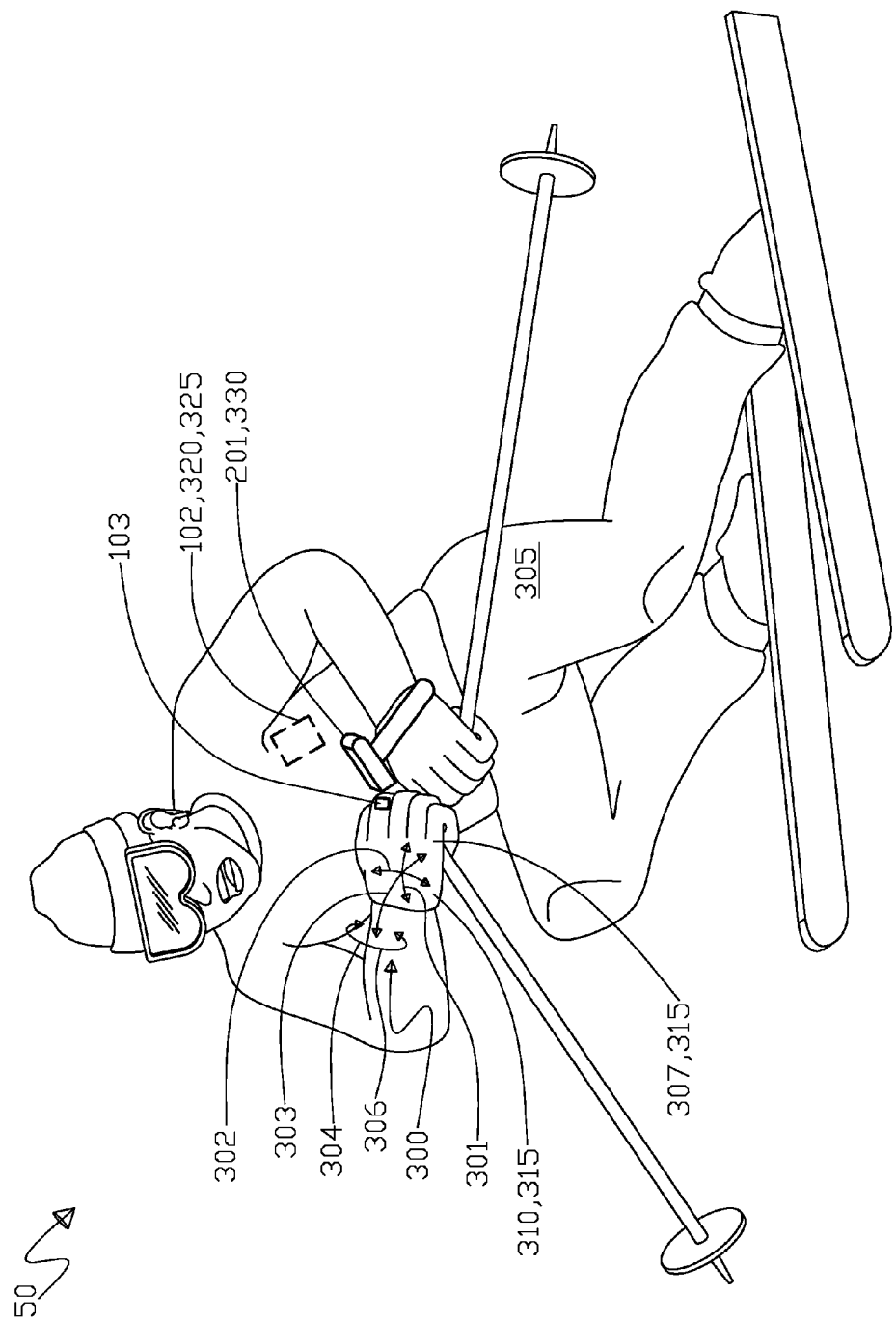
FIG. 7 is a use view drawing of the movement control system showing the user with their gloved hand during alpine snow skiing engaging in movement of their gloved hand in near field relation to the sensor to effectuate a play command to a portable media delivery communication device.

Following, FIG. 7 is a use view drawing of the movement control system 50 showing the user 305 with their gloved 315 hand 307 during alpine snow skiing engaging in movement 300 of their gloved 315 hand 307 in near field relation to the sensor 330 to effectuate a play command 320 to the portable media delivery communication device 102.

Figure 8:
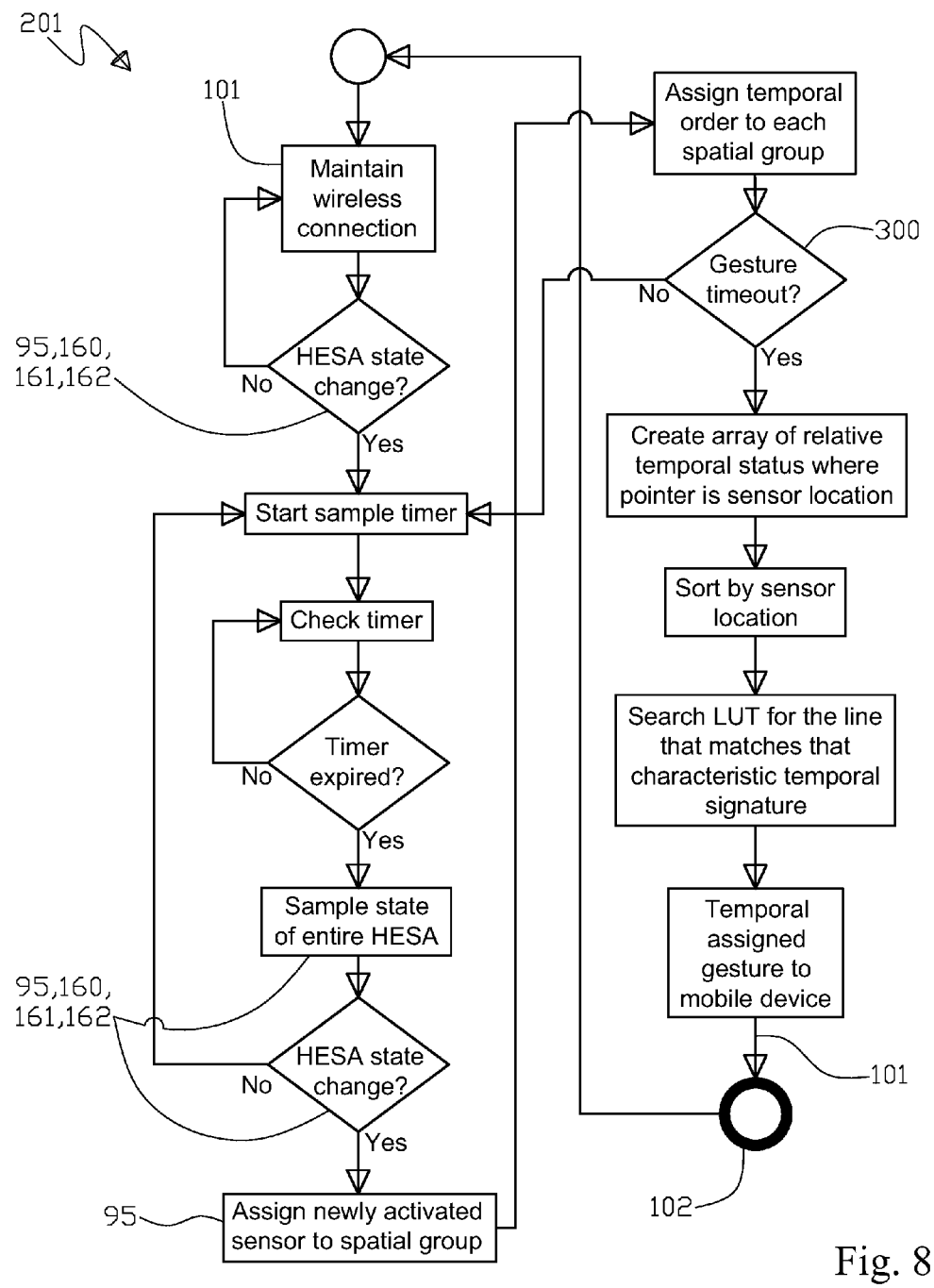
FIG. 8 shows a diagrammatic process flow chart for the movement electrical control system.

Next, FIG. 8 shows a diagrammatic process flow chart for the movement control system 50.

Broadly, in looking at FIGS. 1 to 8, the movement control system 50 for converting movement 300 by an object 310 into a change of state 320 for an article 325 is disclosed, with the movement control system 50 including sensing circuitry 330 that is operative upon activation to wirelessly pickup a near field movement 300 by the object 310 and subsequently generate a sensor signal 203, see in particular FIGS. 1, 2, 4, 5, and 7. Further included in the movement electrical control system 50 is control circuitry 201 that is operative to monitor the sensor signal 203 and to produce an event marker signal 101 upon receipt of the sensor signal 203, the event marker signal 101 is in electrical communication with the article 325 that effectuates a change of state 320 based upon the event marker signal 101, again see FIGS. 1, 2, 4, 5, and 7.

As an option for the movement control system 50, wherein the sensing circuitry 30 further comprises a hall effect sensor 95 and a remote magnet 103 disposed within the object 310, wherein operationally the magnet 103 moving 300 in near field proximity to the sensing circuitry 330 activates the sensing circuitry 330 to generate the sensor signal 203, see FIGS. 1, 3, and 6 to 8.

Another option, for the movement control system 50, wherein the sensing circuitry 330 further comprises a plurality 200 of hall effect sensors 95 forming an array 100 and support circuitry 195 to operatively distinguish a first near field proximity movement 301, 302, 303, 304, 306 from a second near field proximity movement 301, 302, 303, 304, 306 from the object 310 such that the sensing circuitry 330 is operative to generate a first sensor signal 204 and a second sensor signal 205 and the control circuitry 201 further comprises additional circuitry 202 to monitor the first sensor signal 204 and the second sensor signal 205 for the control circuitry 201 to operatively generate a first event marker signal 206 and a second event marker signal 207 to the article 325 that effectuates a first change of state 320 and a second change of state 320 in the article 325, see in particular FIG. 2 and also FIGS. 3 to 8.

A further option for the movement control system 50, wherein the sensing circuitry 330 further comprises a 3D magnetic sensor 335 and a remote magnet 103 disposed within the object 310, wherein operationally the magnet 103 moving 300 in near field proximity to the sensing circuitry 330 activates the sensing circuitry 330 to generate the sensor signal 203, see FIGS. 1, 3, and 6 to 8.

Yet another option for the movement control system 50, wherein the sensing circuitry 330 further comprises support circuitry 240 to operatively distinguish a first near field proximity movement 301, 302, 303, 304, 306 from a second near field proximity movement 301, 302, 303, 304, 306 from the object 310 such that the sensing circuitry 330 is operative to generate a first sensor signal 204 and a second sensor signal 205. Further, the control circuitry 201 further comprises additional circuitry 208 to monitor the first sensor signal 204 and the second sensor signal 205 for the control circuitry 201 to operatively generate a first event marker signal 206 and a second event marker signal 207 to the article 325 that effectuates a first change of state 320 and a second change of state 320 in the article 325, see FIGS. 1, 3, and 6 to 8.

Continuing, another option for the movement control system 50, wherein the sensing circuitry 10 further comprises a radar chip 350, wherein operationally the object 310 moving in near field proximity 300 to the sensing circuitry 310 activates the sensing circuitry 310 to generate the sensor signal 203, see FIGS. 1, 3, and 6 to 8. The radar chip 350 is preferably available from Imec/Infineon as a 79 GHz automotive radar CMOS Sensor chip.

Yet further options for the movement control system 50, are wherein the sensing circuitry 330 further comprises support circuitry 350 to operatively distinguish a first near field proximity movement 301, 302, 303, 304, 306 from a second near field proximity movement 301, 302, 303, 304, 306 from the object 310 such that the sensing circuitry 330 is operative to generate a first sensor signal 204 and a second sensor signal 205. Further, the control circuitry 201 further comprises additional circuitry 209 to monitor the first sensor signal 204 and said second sensor signal 205 for the control circuitry 201 to operatively generate a first event marker signal 206 and a second event marker signal 207 to the article 325 that effectuates a first change of state 320 and a second change of state 320 in the article 325, see FIGS. 1, 3, and 6 to 8.

A continuing option for the movement control system 50, is wherein the sensing circuitry 330 further comprises a flex capacitor 355, wherein operationally the object 310 moving in near field proximity 300 to the sensing circuitry 330 activates the sensing circuitry 330 to generate the sensor signal 203, see FIGS. 1, 3, and 6 to 8. The flex capacitor 355 is preferably available from Stretch Sense as an integrated BLE Fabric stretch kit.

Alternatively, an option for the movement control system 50, wherein the sensing circuitry 330 further comprises support circuitry 360 to operatively distinguish a first near field proximity movement 301, 302, 303, 304, 306 from a second near field proximity movement 301, 302, 303, 304, 306 from the object 310 such that the sensing circuitry 330 is operative to generate a first sensor signal 204 and a second sensor signal 205. Further, the control circuitry 201 further comprises additional circuitry 210 to monitor the first sensor signal 204 and the second sensor signal 205 for the control circuitry 201 to operatively generate a first event marker signal 206 and a second event marker signal 207 to the article 325 that effectuates a first change of state 320 and a second change of state 320 in the article 325, see FIGS. 1, 3, and 6 to 8.

Other options for the movement control system 50, are wherein the sensing circuitry 330 further comprises an ultrasonic transceiver 365, wherein operationally the object 310 moving in near field proximity 300 to the sensing circuitry 330 activates the sensing circuitry 330 to generate the sensor signal 203, see FIGS. 1, 3, and 6 to 8. The ultrasonic transceiver is preferably available from National Semiconductor Model LM1812.

Other options for the movement control system 50, are wherein the sensing circuitry 330 further comprises support circuitry 370 to operatively distinguish a first near field proximity movement 301, 302, 303, 304, 306 from a second near field proximity movement 301, 302, 303, 304, 306 from the object 310 such that the sensing circuitry 330 is operative to generate a first sensor signal 204 and a second sensor signal 205. Further, the control circuitry 201 further comprises additional circuitry 211 to monitor the first sensor signal 204 and the second sensor signal 205 for the control circuitry 201 to operatively generate a first event marker signal 206 and a second event marker signal 207 to the article 325 that effectuates a first change of state 320 and a second change of state 320 in the article 325, see FIGS. 1, 3, and 6 to 8.

Another option for the movement control system 50 for converting movement 300 by the user's 305 hand 307 into play commands 320 for a portable media delivery device 102, the movement electrical control system 50 including sensing circuitry 330 that is operative upon activation to wirelessly pickup a near field movement 300 by the user's 305 hand 307 and subsequently generate a sensor signal 203, see FIG. 7 in particular, and FIGS. 1, 3, 6, and 8.

Further included is control circuitry 201 that is operative to monitor the sensor signal 203 and to produce an event marker signal 101 upon receipt of the sensor signal 203, the event market signal 101 is in electrical communication with a portable media delivery device 102 that effectuates a play command 320 based upon the event marker signal 101, again see FIG. 7 in particular and FIGS. 1, 3, 6, and 8.

As an option for the movement control system 50, wherein the sensing circuitry 330 further comprises a hall effect sensor 95 and a remote magnet 103 disposed upon the user's 305 hand 307, wherein operationally the magnet 103 moving in near field proximity 300 to the sensing circuitry 330 activates the sensing circuitry 330 to generate the sensor signal 203, see FIGS. 1, 3, 6, 7, and 8.

Another option for the movement control system 50, wherein the sensing circuitry 330 further comprises a plurality 200 of hall effect sensors 95 and support circuitry 195 to operatively distinguish a first near field proximity movement 301, 302, 303, 304, 306 from a second near field proximity movement 301, 302, 303, 304, 306 from the object 310 such that the sensing circuitry 330 is operative to generate a first sensor signal 204 and a second sensor signal 205. Further, the control circuitry 201 further comprises additional circuitry 202 to monitor the first sensor signal 204 and the second sensor signal 205 for the control circuitry 201 to operatively generate a first event marker signal 206 and a second event marker signal 207 to the article 325 that effectuates a first play command 320 and a second play command 320 in the article 325, see FIGS. 1 to 8.

Method of Use

Looking at FIG. 7 in particular and FIGS. 1 to 6, plus FIG. 8, a method of using the movement control system 50 is disclosed, comprising the steps of firstly providing a magnet 103 as previously described that is attached to the user's 305 hand 307, see FIG. 7 and FIGS. 1 and 2, and FIGS. 4 and 5. Secondly a step of providing a portable media delivery device 102 also as previously described, see FIGS. 1, 2, and 7. Thirdly a step of providing a movement control system 50, also as previously described.

Fourth a step of moving 300 the user's 305 hand 307 with the magnet 103 in a first movement 301, 302, 303, 304, 306 in near field proximity to the sensing circuitry 330 to effectuate a first play command 320 to the portable media device 102, again see FIGS. 1, 2, and 7.

Optionally, on the method of use for the movement control system 50, further comprising a step of moving the user's 305 hand 305 with the magnet 103 in a second movement 301, 302, 303, 304, 306 in near field proximity to the sensing circuitry 330 to effectuate a second play command 320 to the portable media device 102.

Incorporation by reference to the specification for the source code as follows:
Source code—concurrently submitted as ASCII text files;
Files description: Source code for the code of the patent application.
File name: MovementControlSysSourceCodeASCII
File size (KB): 23
File creation date: Nov. 23, 2015
Author: Anthony Peter Dobaj Incorporation by reference to the specification for the Look Up Table (LUT) as follows:
Look Up Table (LUT)
File Name: MovementControlSysLUTcute
File size (KB): 45
Pages 23
File creation date: Nov. 23, 2015
Author: Anthony Peter Dobaj This patent file contains at least one drawing executed in color. Copies of this patent with a color drawing will be provided by the Office upon request and payment of the necessary fee.

Bill of Material (BOM) Follows;
Qty 3, for R5, R8, R11, JP4, JP7, JP11, JP16, Vishay Dale CRCW08050000Z0EA
Qty 5, 0.01 uF for C, C7, C9, Kemet C0805C103K3RACTU
Qty 12, 0.1 uF for C12, C16, C18, C19, C20, C21, C22, C23, C23, C25, C26, C27, Kemet C0805C103K4RACTU
Qty 1, 0.38 uF for C3, Kemet C0805C394K4RACTU
Qty 1, 1.5 uH for L1, Kemet C0805C273J5RACTU
Qty 1, 1.5 uH for L2, muRata 1286AS-H-1R5M=P2
Qty 2, 100K for R2, R19, Vishay Dale CRCW0805100KJNEA
Qty 1, 100 uF for C30 Taiyo Yuden PMK212BBJ107MG-T
Qty 8, 10K for R7, R12, R17, R26, R28, R30, Vishay Dale CRCW080510KOJNEA
Qty 1, 10M for R16, Vishay Dale CRCW080510MOJNEA
Qty 4, 10 uF for C2, C8, C17, C29, Kemet C0805C106K8PACTU
Qty 3, 110 for R6, R9, R15, Vishay Dale CRCW0805110RJNEA
Qty 2, 12 pF for C3, C4, Kemet C0805C120J5GACTU
Qty 1, 1K for R1, Vishay Dale CRCW08051K00JNEA
Qty 2, 1M for R3, R4, Vishay Dale CRCW08051M00JNEA
Qty 1, 1 nF for C11, Kemet C0805C102K5RACTU
Qty 1, 2.2 uF for C6, Kemet
Qty 5, 390 for R22, R23, R24, R25, Vishay Dale CRCW0805390RJNEA
Qty 1, 3D Sensor for U25, Infineon TLV493DA1B6HTSA2
Qty 2, 4.7 uF for C10, C14, Kemet C0805C475K8PACTU Qty 1, Long Pads for U1, Anaren A20737AGM
Qty 1, Y1, Abracon AB26TRQ-32.768KHZ-T
Qty 1, S1, Omron B3U-1000P
Qty 1, Q1, Diodes, Inc. BSS123-7-F
Qty 1, S2, Copal Electronics CL-SB-12A-01T
Qty 1, BT1, MPD BU2032SM-G
Qty 1, Decawave DWM1000
Qty 1, U19, Exar XRA1201PIG24-F
Qty 5, LED1, Avago HSME-C150
Qty 1, U27, Intersil ICM7555CBAZ
Qty 2, JP1, JP2, Keystone Electronics 5100
Qty 12, U8, U15, U23, Y26, U30, U35, Rohm BU52025G-TR
Qty 1, U20, ST Microelectronics LIS3DHTR
Qty 1, U21, Texas Instruments TPS63051RMWT

CONCLUSION

Accordingly, the present invention of an Movement Control System has been described with some degree of particularity directed to the embodiments of the present invention. It should be appreciated, though; that the present invention is defined by the following claims construed in light of the prior art so modifications or changes may be made to the exemplary embodiments of the present invention without departing from the inventive concepts contained therein.

The invention claimed is:

1. A movement control system for converting a varying time and roll/pitch position interval temporal movement by an object into a change of state for an article, said movement control system comprising:
   (a) sensing circuitry including a plurality of sensors in an array, that are operative upon activation to wirelessly pickup a near field varying time and roll/pitch position interval temporal movement by the object and subsequently generate a plurality of sensor signals; and
   (b) control circuitry that is operative to monitor said plurality of sensor signals and to produce a particular event marker signal via comparing said plurality of sensor signals to a look up table (LUT) that has an individual sensor firing sequence that is associated with said particular event marker signal, wherein, said particular event marker signal is in electrical communication with the article that effectuates a change of state in the article based upon said particular event marker signal.

2. A movement control system according to claim 1 wherein said sensing circuitry array further comprises a plurality of hall effect sensors and a remote magnet disposed within the object, wherein operationally said magnet moving in said varying time and roll/pitch position interval temporal movement in near field proximity to said sensing circuitry array and activates said sensing circuitry array to generate said plurality of sensor signals.

3. A movement control system according to claim 2, wherein said sensing circuitry array further comprises support circuitry to operatively distinguish a first near field proximity varying time and roll/pitch position interval temporal movement from a second near field proximity varying time and roll/pitch position interval temporal movement from the object such that said sensing circuitry is operative to generate a first sensor signal and a second sensor signal and said control circuitry further utilizes said LUT in that said LUT further comprises a plurality of individual sensor firing sequences that are each associated with a first event marker signal and a second event marker signal, to operatively generate said first event marker signal and said second event marker signal to the article that effectuates a first change of state and a second change of state in the article.

4. A movement control system according to claim 1 wherein said sensing circuitry array further comprises a 3D magnetic sensor and a remote magnet disposed within the object, wherein operationally said magnet moving in said varying time and roll/pitch position interval temporal movement in near field proximity to said sensing circuitry array activates said sensing circuitry array to generate said plurality of sensor signals.

5. A movement control system according to claim 4, wherein said sensing circuitry array further comprises support circuitry to operatively distinguish a first near field proximity varying time and roll/pitch position interval temporal movement from a second near field proximity varying time and roll/pitch position interval temporal movement from the object such that said sensing circuitry array is operative to generate a first sensor signal and a second sensor signal and said control circuitry further utilizes said LUT in that said LUT further comprises a plurality of individual sensor firing sequences that are each associated with a first event marker signal and a second event marker signal, to operatively generate said first event marker signal and said second event marker signal to the article that effectuates a first change of state and a second change of state in the article.

6. A movement control system according to claim 1 wherein said sensing circuitry array further comprises a radar chip, wherein operationally the object moving in said varying time and roll/pitch position interval temporal movement in near field proximity to said sensing circuitry array activates said sensing circuitry array to generate said plurality of sensor signals.

7. A movement control system according to claim 6, wherein said sensing circuitry array further comprises support circuitry to operatively distinguish a first near field proximity varying time and roll/pitch position interval temporal movement from a second near field proximity varying time and roll/pitch position interval temporal movement from the object such that said sensing circuitry array is operative to generate a first sensor signal and a second sensor signal and said control circuitry further utilizes said LUT in that said LUT further comprises a plurality of individual sensor firing sequences that are each associated with a first event marker signal and a second event marker signal, to operatively generate said first event marker signal and said second event marker signal to the article that effectuates a first change of state and a second change of state in the article.

8. A movement control system according to claim 1 wherein said sensing circuitry array further comprises a flex capacitor, wherein operationally the object moving in said varying time and roll/pitch position interval temporal movement in near field proximity to said sensing circuitry array activates said sensing circuitry to generate said plurality of sensor signals.

9. A movement control system according to claim 8, wherein said sensing circuitry array further comprises support circuitry to operatively distinguish a first near field proximity varying time and roll/pitch position interval temporal movement from a second near field proximity varying time and roll/pitch position interval temporal movement from the object such that said sensing circuitry array is operative to generate a first sensor signal and a second sensor signal and said control circuitry further utilizes said LUT in that said LUT further comprises a plurality of individual sensor firing sequences that are each associated with a first event marker signal and a second event marker signal, to operatively generate said first event marker signal and said second event marker signal to the article that effectuates a first change of state and a second change of state in the article.

10. A movement control system according to claim 1 wherein said sensing circuitry array further comprises an ultrasonic transceiver, wherein operationally the object moving in said varying time and roll/pitch position interval temporal movement in near field proximity to said sensing circuitry array activates said sensing circuitry array to generate said plurality of sensor signals.

11. A movement control system according to claim 10, wherein said sensing circuitry array further comprises support circuitry to operatively distinguish a first near field proximity varying time and roll/pitch position interval temporal movement from a second near field proximity varying time and roll/pitch position interval temporal movement from the object such that said sensing circuitry array is operative to generate a first sensor signal and a second sensor signal and said control circuitry further utilizes said LUT in that said LUT further comprises a plurality of individual sensor firing sequences that are each associated with a first event marker signal and a second event marker signal, to operatively generate said first event marker signal and said second event marker signal to the article that effectuates a first change of state and a second change of state in the article.

12. A movement control system for converting a varying time and roll/pitch position interval temporal movement by a user's hand into play commands for a portable media delivery device, said movement control system comprising:
(a) sensing circuitry including a plurality of sensors in an array that are operative upon activation to wirelessly pickup a near field varying time and roll/pitch position interval temporal movement by the user's hand and subsequently generate a plurality of sensor signals; and
(b) control circuitry that is operative to monitor said plurality of sensor signals and to produce a particular event marker signal via comparing said plurality of sensor signals to a look up table (LUT) that has an individual sensor firing sequence that is associated with said particular event marker signal, wherein, said particular event marker signal is in electrical communication with a portable media delivery device that effectuates a play command based upon said particular event marker signal.

13. A movement control system according to claim 12 wherein said sensing circuitry array further comprises a plurality of hall effect sensors and a remote magnet disposed upon the user's hand, wherein operationally said magnet moving in a varying time and roll/pitch position interval temporal manner in near field proximity to said sensing circuitry array and activates said sensing circuitry array to generate said plurality of sensor signals.

14. A movement control system according to claim 13, wherein said sensing circuitry array further comprises support circuitry to operatively distinguish a first near field proximity varying time and roll/pitch position interval temporal movement from a second near field proximity varying time and roll/pitch position interval temporal movement from the user's hand such that said sensing circuitry array is operative to generate a first sensor signal and a second sensor signal and said control circuitry further utilizes said LUT in that said LUT further comprises a plurality of individual sensor firing sequences that are each associated with a first event marker signal and a second event marker signal, to operatively generate said first event marker signal and said second event marker signal to the portable media delivery device that effectuates a first play command and a second play command in the portable media delivery device.

15. A method of using a varying time and roll/pitch position interval temporal movement control system, comprising the steps of:
(a) providing a magnet that is attached to a user's hand;
(b) providing a portable media delivery device;
(c) providing a movement control system that includes a sensing circuitry array that has a plurality of hall effect sensors with support circuitry to operatively distinguish a first near field proximity varying time and roll/pitch position interval temporal movement by said magnet attached to the user's hand from a second near field proximity varying time and roll/pitch position interval temporal movement by said magnet attached to the user's hand such that said sensing circuitry is operative to generate a first sensor signal and a second sensor signal and control circuitry that further utilizes a look up table (LUT) in that said LUT further comprises a plurality of individual sensor firing sequences that are each associated with a first event marker signal and a second event marker signal, to operatively generate said first event marker signal and said second event marker signal to the portable media delivery device that effectuates a first play command and a second play command in the portable media device; and
(d) moving the user's hand in a varying time and roll/pitch position interval temporal manner with said magnet in a first varying time and roll/pitch position interval temporal movement in near field proximity to said sensing circuitry array to effectuate the first play command to the portable media device.

16. A method of using a movement control system according to claim 15 further comprising a step of moving the user's hand in a varying time and roll/pitch position interval temporal manner with said magnet in a second varying time and roll/pitch position interval temporal movement in near field proximity to said sensing circuitry array to effectuate a second play command to the portable media device.

* * * * *